May 12, 1931. S. W. MILLER 1,805,181
HEAT RETAINING HOOD FOR GAS OR ELECTRIC FUSION WELDING
Filed Nov. 6, 1928
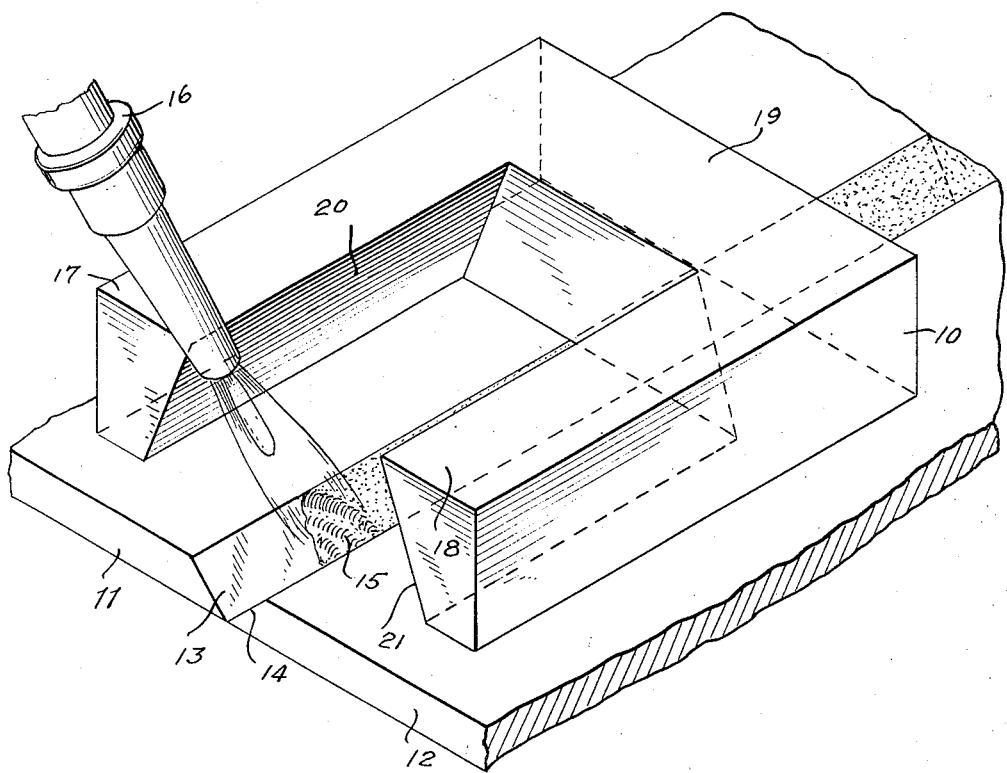
Samuel W. Miller, INVENTOR,
BY
ATTORNEYS.

Patented May 12, 1931

1,805,181

UNITED STATES PATENT OFFICE

SAMUEL W. MILLER, OF HOLLIS, NEW YORK, ASSIGNOR TO OXWELD ACETYLENE COMPANY, A CORPORATION OF WEST VIRGINIA

HEAT RETAINING HOOD FOR GAS OR ELECTRIC FUSION WELDING

Application filed November 6, 1928. Serial No. 317,607.

This invention pertains to fusion welding and more specifically to means for preventing the escape of part of the welding heat during the formation of such welds.

During the process of forming fusion welds considerable heat is lost by being reflected from the surface of the article being welded. This loss of heat results in loss of economy, an increase in the welding time, and a reduction in the quality of the weld. Therefore, one of the objects of this invention is to provide a heat retaining hood for use with fusion welding apparatus to prevent the loss of part of the welding heat. Other aims, objects, and novel features, will be apparent from the drawing and the following description.

I attain the objects of the present invention by the apparatus shown in the accompanying drawing which is a perspective of my improved hood in operative position around a fusion weld in the process of being formed.

The apparatus shown in the drawing may comprise a hood 10 that is adapted for resting on the surface of metal plates such as 11 and 12 that are being joined along suitable beveled abutting edges 13 and 14 by a fusion weld 15 that is being formed by a welding blowpipe 16 of which only a portion is shown.

The hood 10 may comprise substantially parallel sides or arms 17 and 18 that are joined by an integral end 19 thereby forming a three sided hood having a slot therein open at the top, bottom, and one end. The inner surfaces 20 and 21 of the arms 17 and 18 that face each other and the weld 15 may be beveled so they are nearer together at the top than they are at the bottom, and thereby, reflect more of the welding heat back on the weld than they would if they were vertical or beveled outward. The surfaces 20 and 21 should be at such an angle to the weld that the escaping welding heat is reflected back on the weld and not out the top of the slot, and at such a distance from the weld that they become heated and radiate heat back on the weld, but not close enough to reflect sufficient heat back on the welding apparatus to injure it. The size and shape of the hood may vary according to the size of the weld and various other welding conditions but for general use I have secured good results with a hood 7 inches long, 6 inches wide, and 2 inches thick, having a slot 3 inches wide and 5 inches long therein open at the top, bottom, and one end, with the sides thereof inclined at an angle of 70° to the surface upon which the hood rests. For some classes of work it may be desirable to construct the hood so it is closed on four sides instead of three, as just described, and so the sides of the slot are at a different angle from that specified.

The hood 10 may be of any uninflammable material such as iron or steel but better results are obtained when it is of a refractory material that is a poor conductor of heat such as firebrick, magnesia, or asbestos, because their low heat conductivity concentrates the heat close to the weld, instead of carrying it away as would be done by a good heat conductor such as a metal.

The hood 10 may be used to advantage with gas welding apparatus such as the oxy-acetylene and other gas welding blowpipes, and also with electric welding apparatus such as that used in the metallic electrodes process and the carbon arc process, and, furthermore, the use of the hood 10 is not confined to welds made in structures having a flat surface as the hood may be made to conform to surfaces of other shapes such as those of cylindrical tanks, barrels, and pipes.

In practice the hood may be placed on the article to be welded so the weld is made in the slot and so the metal that is to be welded is heated by the heat reflected from the sides of the slot. Preferably, the weld is made near the open end of the slot and the hood is so placed that the direction of the weld is from the open end of the slot toward the closed end. As the weld progresses the hood is moved along so the weld is formed near the open end of the slot and so the metal ahead of the weld lies in the slot and is heated. The effectiveness of the hood in heating the metal ahead of the weld is very marked as the entire area of the plate at the bottom of the slot in the hood becomes red hot so the weld may be formed faster and with better quality than when no hood is used, because part of the heat of the weld that usually escapes and is wasted, is reflected back on the weld by the faces 20 and 21 of the slot in the hood 10, and because part of the heat that usually escapes heats the surfaces 20 and 21 to a high temperature and is radiated back on the weld and the metal surrounding the weld that must be heated as the weld is made.

It is well known that preheating the metal to be welded, that is, heating it before it is welded, or maintaining it in a heated condition during the welding operation, reduces the amount of welding gases or electric current required to make the weld. By the use of the hood herein described a similar effect is obtained at less cost, as the welding heat that is usually wasted is intercepted by the hood and reflected and radiated back on the weld and the surrounding metal which is kept in a heated condition while it is being welded so less welding gases or electric current is required to make the weld than would be required if no hood were used.

Various changes and modifications in the size and shape of the hood may be made to adapt it for surrounding welds of various kinds, that may be made in articles and structures of various forms, without departing from the spirit of the invention or sacrificing any of the rights thereunder.

I claim:

1. A hood for use during welding and adapted to partially surround the weld during its formation, said hood comprising an integral U-shaped member, the inner walls of the sides of said member converging upwardly to form a reflecting surface whereby a portion of the heat is reflected back onto the weld.

2. A three sided hood open at the top, bottom, and one end, thereby forming a rectangular opening in the hood having sides sloping inward so the top of the opening is narrower than the bottom; said hood being adapted for resting on the surface of metal being fusion welded so the weld is made in the opening in the hood and the escape of part of the welding heat is prevented by intercepting it by the sides of the opening and reflecting it back on the weld.

3. A three sided hood open at the top, bottom and one end thereby forming an opening in the hood having sides extending inwardly so that the top of the opening is narrower than the bottom; said hood being adapted to rest on the surface of metal being welded so that the weld is made in said opening and the escape of part of the welding heat is prevented by intercepting it by the sides of the opening and reflecting it back on the weld.

In testimony whereof, I affix my signature.

SAMUEL W. MILLER.